United States Patent [19]
Albonesi

[11] Patent Number: 5,119,486
[45] Date of Patent: Jun. 2, 1992

[54] MEMORY BOARD SELECTION METHOD AND APPARATUS

[75] Inventor: David H. Albonesi, Hudson, Mass.

[73] Assignee: Prime Computer, Natick, Mass.

[21] Appl. No.: 297,389

[22] Filed: Jan. 17, 1989

[51] Int. Cl.[5] ............................................. G06F 12/00
[52] U.S. Cl. ............................... 395/425; 365/230.03;
364/246.1; 364/246.7; 364/254.4; 364/957.2;
364/966.6; 364/969.1; 364/246.4; 364/259.2;
364/DIG. 1
[58] Field of Search ... 364/200 MS File, 900 MS File;
365/189.02, 230.03, 230.04, 238.5, 241

[56] References Cited

U.S. PATENT DOCUMENTS

| | | | |
|---|---|---|---|
| 3,958,223 | 5/1976 | Cochran | 364/900 |
| 4,189,767 | 2/1980 | Ahuja | 364/200 |
| 4,234,934 | 11/1980 | Thorsrud | 364/900 |
| 4,388,707 | 6/1983 | Komatsu et al. | 365/230.03 |
| 4,571,676 | 2/1986 | Mantelling et al. | 364/200 |
| 4,592,011 | 5/1986 | Mantelling et al. | 364/900 |
| 4,627,017 | 12/1986 | Blount et al. | 364/900 |
| 4,752,915 | 6/1988 | Suzuki et al. | 365/230.03 |

OTHER PUBLICATIONS

Hayes, John P., *Computer Architecture and Organization*, McGraw-Hill Book Company, 1978, pp. 94-95.

*Primary Examiner*—Stuart N. Hecker
*Assistant Examiner*—Rebecca L. Rudolph
*Attorney, Agent, or Firm*—Wolf, Greenfield & Sacks

[57] ABSTRACT

The invention comprises a combined hardware and software method and apparatus for determining the size of memory located on a memory card inserted in the slot of a memory backplane of a computer system. The method and apparatus also provides a means for selecting the memory card which contains a requested memory location. Each memory slot has associated therewith a multibit code which indicates the size of the memory installed in the associated slot. The code from each slot is hardwired to the system memory controller which, given the codes can, as part of its memory initialization route, scan these bits and decode them in order to determine the amount of memory installed in each slot of the memory backplane.

Each slot is further provided with an X-bit starting address which uniquely defines the lowest address available from the board inserted in the associated slot. The starting address from each slot is compared with the leftmost X-bits of the currently requested memory address. If the leftmost X-bits of the currently requested memory address are greater than the X-bit starting address of a given slot yet less than the X-bit starting address of the succeeding slot, then it is known that the given address must be contained on the given slot. The board containing the currently requested memory address can thereby be determined.

17 Claims, 4 Drawing Sheets

MEMORY BOARD SELECTION METHOD AND APPARATUS

FIELD OF THE INVENTION

The invention relates to a method and apparatus for sizing and selecting memory boards in a memory subsystem of a computer system. More particularly, the invention relates to a combined hardware and software method and apparatus for indicating the amount of memory installed in each slot of a memory backplane and selecting the proper memory board to service a memory operation.

BACKGROUND OF THE INVENTION

Computer systems requiring large amounts of memory capacity are often designed to allow the purchaser or user of the computer system to select the amount of memory in the system. The purchaser of the computer system can equip the system with the amount of memory necessary for his current needs but have the ability to expand at a later date if his need for memory capacity increases.

A system with expandable memory, typically provides a memory subsystem comprising a memory backplane in which memory cards can be installed as needed. Typically, the memory backplane comprises a series of slots in which memory cards can be inserted. The slots are interfaced to a memory controller which supervises the memory operations and memory read or write requests from the central processing unit (CPU). The memory cards (or memory boards) contain a group of memory chips thereon which interface to logic devices contained on the same memory board. When the cards are inserted into the slots on the memory backplane, the logic devices become electrically connected to address and data buses interfaced to the memory controller of the computer system. The amount of memory on each card is not necessarily fixed and can be one of several values thus affording the purchaser even greater flexibility in terms of selectable memory capacity.

In a system as just described wherein the total available memory as well as memory available on each card are not fixed, means must be provided for communicating to the computer operating system the size and location of the available memory. In order to know how much physical memory is in the system, the operating system must "know" which slots are occupied by memory cards, the amount of memory available on each card, and the addresses of the memory on each card.

The memory available on any given card is a consecutive block of addresses and therefore the memory controller and operating system need only know the starting address and ending address of the memory space available on that card. Once this information is available to the operating system, it can select the memory card containing the memory address required for any memory operation.

In systems having very large amounts of memory, the system can be designed such that a single address addresses a large block of data, for instance, eight double words. After the data is retrieved from an address location, the system can break up the data into smaller components to extract the data as required.

Further, memory systems traditionally have comprised more than one memory subsystem, each of which comprises a memory controller and a series of memory boards plugged into the slots of a memory backplane.

One method used in the prior art for selecting the appropriate card for a memory operation is to have a unique combination of "ID" bits for each memory slot hardwired in the memory backplane. When a memory location (or address) is sent out on the address bus for a requested memory operation, the ID bits for each memory board are compared with certain bits in the requested address. If the bits match, as they should for one and only one board, that board is selected for the memory operation.

This method will be more particularly described with respect to a memory subsystem having addresses of A bits in length, $2^C$ memory slots, and a maximum memory board density of $2^B$ bytes. The low order A-B bits of the address are used as the address on the selected board. The remaining high order bits, which should comprise C bits, comprise the address bits which are compared against the hardwired ID bits to select the appropriate board. The ID bits for each slot, of course, also comprise C bits. This board selection scheme is easy to implement if only one size memory board is available in the system. However, where the memory board density may be one of several values a problem exists because any board smaller than the maximum density board cannot support the full address space supplied by each slot. Since the low order A-B bits of each address constitutes a number of memory addresses which exceeds the actual amount of memory in any board smaller than the maximum density board, large gaps of memory exist in the range of addresses. Typically, what is done to prevent the addressing of an empty space is that one or more of the highest of the low order A-B bits are reserved for use as additional select bits. For instance, in a system where there are two possible memory board sizes of X and 2X, the highest of the low order bits is used as an additional select bit. If this bit is zero, then the board can be selected; if the bit is one, however, then the board is not selected since the upper half of the memory reserved for this slot is vacant. If, for example, the possible memory board sizes were X and 4X, then the two highest of the low order A-B address bits are used as additional select bits. In this situation, if these bits are 00, the board is selected; if the bits are anything but 00, then the board is not selected.

Some means must be provided in the system for mapping out the holes from the available address space. Typically, when the operating system tests and initializes the memory subsystem at power up, it locates the memory holes by attempting to write and read each memory location. The operating system detects the memory locations that are vacant by receiving missing memory module reports from the memory hardware and reports this as a missing memory module. The operating system records the missing memory module locations as nonexistent locations in address space.

This scheme has many substantial shortcomings. First, additional software is required to find the holes in memory. Secondly, with the continuing increases in memory board sizes in the art, finding the holes can be a very time consuming task, adding to the time to power up the system. Further, there are usually certain memory locations at the beginning of the memory which are reserved for use of the memory controller. Therefore, a memory board must be placed in the first slot. Should the system installer neglect to place a memory board in the first slot, then the system would not operate.

In a system having two (or more) memory subsystems, memory contained in the first subsystem may be combined with the memory contained in the second subsystem by either high order interleaving or low order interleaving. In high order interleaving, the first memory subsystem provides addresses zero through X. The second memory subsystem simply provides addresses X+1 through Z. In low order interleaving in a system having only two memory subsystems, for example, the first memory subsystem services the even addresses contained between the beginning address and ending address, zero to Z. The second memory subsystem services the odd addresses contained within the zero to Z address space. If low order interleaving is implemented in the above example of a system with two memory subsystems, the LSB (least significant bit) of the address is used for selecting the memory subsystem which is to service the memory operation. If the LSB is a 0, then subsystem 1 (servicing the even addresses) would respond to the address request. If the LSB is a 1, then memory subsystem 2 would respond to the address request. In the prior art, in order to implement low order interleaving, it was necessary that the holes in each of the memory subsystems parallel the holes in all other memory subsystems. Therefore, in the prior art, the corresponding slots of the memory backplane of each subsystem must contain the same size memory card.

It is an object of the present invention to provide an improved method and apparatus for selecting the memory board containing the memory locations for servicing a memory operation of a computer system.

It is another object of the present invention to eliminate holes in the memory space of a computer system which provides flexible memory capacity.

It is yet a further object of the present invention to provide a computer system requiring less restrictions on the size and placement of memory boards which may be inserted in a memory backplane.

It is a further object of the present invention to provide a combined hardware and software method and apparatus for determining the size of memory boards in a memory backplane of a computer system and selecting the appropriate memory board for servicing a memory operation.

It is an additional object of the present invention to provide an improved memory board selection scheme for a computer system.

It is yet another object of the invention to provide a combined hardware and software method an apparatus for determining the size of memory boards in a memory backplane and which allows the memory subsystem to operate regardless of the number, density, and placement of memory boards in the memory backplane.

It is one more object of the present invention to provide a computer system having multiple memory subsystems whose memory can be arranged alternatively by high order interleaving or low order interleaving.

It is another object of the present invention to provide a computer system having multiple memory subsystems which are low order interleaved in which the memory cards inserted in corresponding slots of each subsystem backplane need not be of equal capacity.

SUMMARY OF THE INVENTION

The invention comprises a combined hardware and software method and apparatus for determining the size of memory located on a memory board inserted in a slot of a memory subsystem backplane of a computer system having expandable memory. The method and apparatus also provides an improved means for selecting the memory board which contains the memory location requested for a memory operation. Further, the invention allows for alternate high or low order interleaving of the memory space of multiple memory subsystems.

Each memory slot has, hardwired to the memory controller, a multibit code which indicates the size of the memory installed in each slot. The code ca be altered when the memory card installed in the slot is changed. The code must have enough bits to provide a unique code for each possible memory card size that can be installed in a slot, including a code to represent the fact that there is no memory installed in a given slot. As part of its memory initialization routine, the system scans these bits in order to determine the total amount of memory installed in the backplane and the amount of memory installed in each slot of the backplane. This information is then passed to the operating system.

An improved method of selecting the memory card which contains the memory location requested for a memory operation is also provided. The board selection scheme compares an X bit starting address for each memory board slot and an X bit ending address for the last board slot with the leftmost X bits of the currently requested memory address, where $X = n + m - p$ and:

$2^p$ bytes = the minimum number of memory bytes which can be contained on a memory card, n = the number of bits in the memory addresses of the computer system. and $2^m$ bytes = the number of bytes accessed by a memory address.

The starting addresses are generated by adding m bits to the right of the actual address of the lowest memory location on the board inserted in the associated slot and truncating after the leftmost X bits. The ending address of the last memory board is obtained in the same manner except that the highest address is truncated.

The starting address of each board and the ending address of the last board are compared with the leftmost X bits of the currently requested memory location by a series of comparators, one comparator for each of the slots plus one extra for the last slot. Each comparator generates two single bit signals in response to each comparison. In the case of the starting address comparators, the first signal indicates whether the leftmost X bits of the requested memory address are less than the starting address of the associated slot. A high signal indicates that the condition is true. The second signal is merely the inverse of the first signal. In the case of the ending address comparator, the first signal indicates if the leftmost X bits of the requested memory address are less than or equal to the ending address. Again, the second signal is merely the inverse of the first signal. The first signal of each comparator is AND ed with the second signal from the preceding comparator. In the case of the ending address comparator, the first output of that comparator is AND-ed with the second output from the comparator of the starting address of the last board. Since the second signal generated by the comparator associated with a given board and the first signal of the suceeding comparator cannot both be high unless the current memory address is higher than the starting address of the given board yet lower than the starting address of the suceeding board, only one of the AND gates can output a high voltage. The comparator which outputs the high voltage uniquely defines the board containing the requested memory address. The eight outputs of the AND gates are then supplied to an 8-bit encoder which outputs the slot location of the requested memory address. That slot then can be enabled to service the memory operation.

An additional feature may be provided by supplying the second output signal of the comparator associated with the ending address of the last board to the memory controller as a memory overflow indicator. If this signal is high, it indicates that a memory location having an address higher than that of the highest address in the subsystem was requested. If a second or subsequent memory subsystems are also coupled to the system, this bit can be disconnected for all but the last memory subsystem. The subsequent memory subsystems would be assigned starting addresses in the same manner described above except for the fact that the starting address of the first board in the subsequent memory subsystems would not be zero but would be the high order bits of the next consecutive address in the system.

Additionally, alternate low or high order interleaving can be provided by the addition of two single bit signals in the memory subsystems, an enable low order interleaving bit and a low order bit signal. For example, in a system containing two memory subsystems, the low order bit is set to zero if the particular subsystem is to respond to even addresses and to 1 if it is to respond to odd addresses. The low order bit is exclusive ORed with the LSB of the requested address. The decision of the exclusive OR gate is fed to the AND gates in the subsystem as an enable signal. Therefore, the particular memory subsystem is only enabled when the low order bits match. To provide alternate high or low order interleaving, the output of the exclusive OR gate, instead of being sent directly to enable the AND gates, is first NAND-ed with the enable low order interleaving bit and the output of the NAND gate is fed to the AND gates as the enable signal. In this manner, if low order interleaving is disabled (the enable low order interleaving bit is low), the memory subsystem is enabled regardless of the comparison of the low order bits, and, if low order interleaving is enabled, then the comparison of the low order bits determines whether the subsystem is enabled or not.

This addressing scheme is not affected by the fact that some of the memory slots may be unoccupied. If a memory slot is unoccupied, it is assigned a starting address which is one more than the ending address of the closest preceding occupied memory slot such that its starting address is the same as the starting address of the suceeding slot. This assures that the AND-ing of the second signal of an unoccupied slot with the first signal of the suceeding slot cannot result in a high output from the associated AND gate.

DETAILED DESCRIPTION OF A PREFERRED EMBODIMENT

Figure 1:
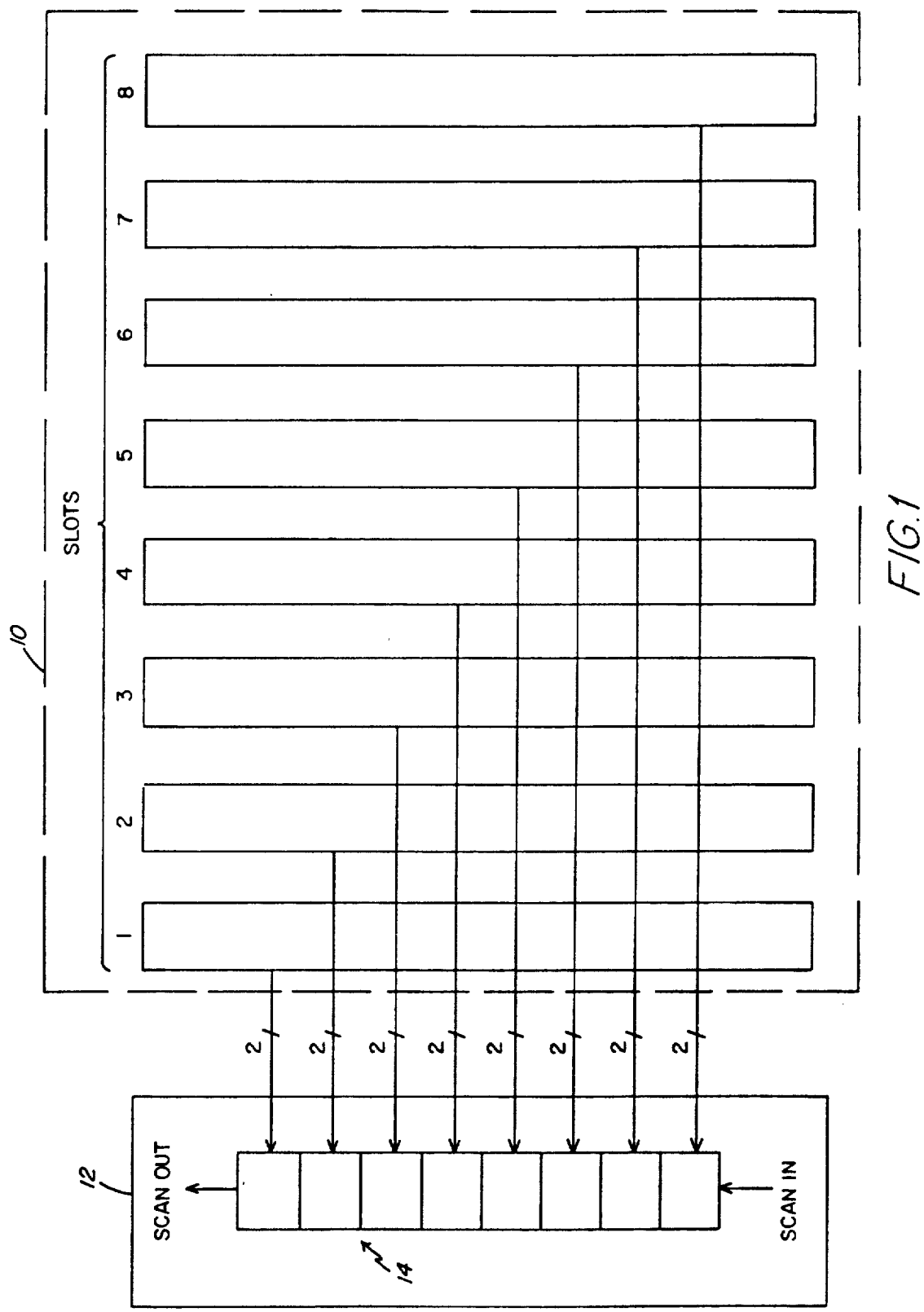
FIG. 1 shows a general illustration of the memory sizing scheme of the present invention.

The invention will be described in relation to FIG. 1 which shows a memory subsystem for a computer system having expandable memory which is provided via a backplane 10 having eight slots for inserting memory boards. Therefore, up to eight cards of additional memory ca be installed in this backplane. If the computer system is designed to accept three different types of memory cards containing three different memory densities then there are four possible memory sizes which could be located at each slot, namely, one of the three cards and zero.

According to the invention, each slot has associated therewith a two bit code which can be hardwired to the memory controller to uniquely define the size of the memory installed therein. In a preferred embodiment, each slot and each memory card which may be inserted in the slots are equipped with two edge connectors in addition to the edge connectors provided for the control, address, and data busses. The two bit code is hardwired on the memory card to supply the desired code to the memory controller via the two additional edge connectors. Assuming that the three possible memory densities for the memory cards are 64 MB, 256 MB and 1 GB, the two bit codes can be as follows:

| CODE | BOARD DENSITY |
|------|---------------|
| 00 | NO BOARD INSTALLED |
| 01 | 64 MB INSTALLED |
| 10 | 256 MB INSTALLED |
| 11 | 1 GB INSTALLED |

The two bit codes from each of the eight slots are then sent to a scan register 14 in a sixteen bit bus. As part of the memory initialization routine, these bits are scanned out of the scan register 14. Software decodes these sixteen bits in order to determine the amount of memory installed in each slot and the total memory in the backplane. This information can then be passed to the operating system.

Figure 2:
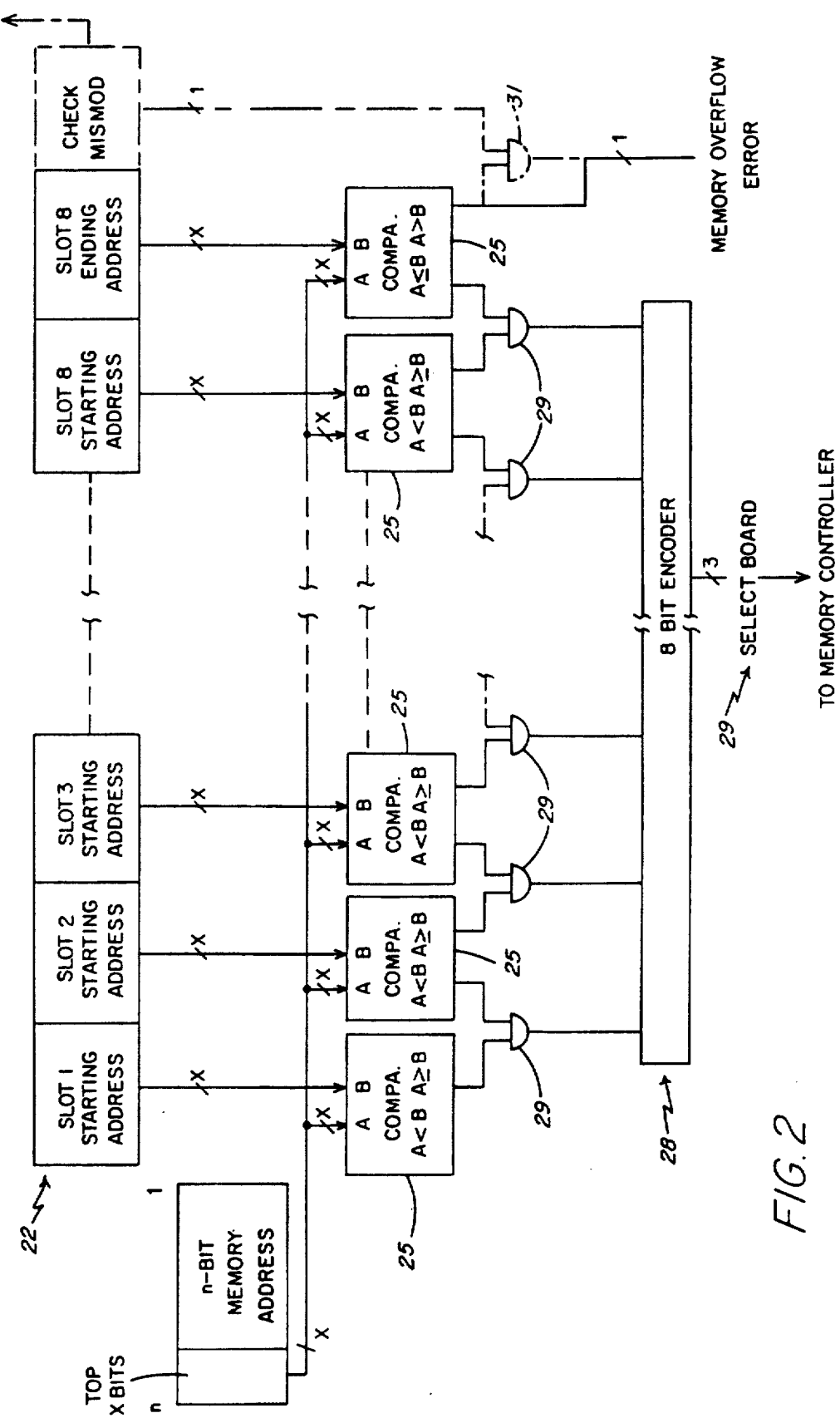
FIG. 2 shows a generalized illustration of the memory board selection hardware of the present invention.

FIG. 2 illustrates the hardware necessary to implement the memory card selection scheme of the present invention. The starting address corresponding to the slots in the memory backplane are numbered as slots 1-8. The slots are consecutive in the stated order (i.e. 1-8), in that the computer system assigns addresses to the memory installed in those slots in consecutive order. For instance, if 64 MB boards are inserted in slots 1 and 2, the computer will assign the first 64M (where $M = 10^6$) consecutive addresses to the memory slot 1 and the second consecutive 64M addresses to the memory in slot 2.

The two bit codes which the memory controller scanned at initialization time serve a second purpose in addition to allowing the memory controller to size the memory. It allows the system to determine the beginning address of each slot and assign to each memory card an X-bit code (where X is a value as explained below) representing the starting address. The system also assigns an X-bit ending address which represents the highest address in the last slot and therefore the last address in the backplane. The board selection scheme uses these X-bit starting addresses (and ending address) to compare them to the currently requested memory address for servicing a computer memory operation in order to determine which slot contains the data for the requested address. The starting address for each board and the ending address of the last board are stored in a scan register 22. The addresses are fed from the scan register 22 to nine X-bit comparators 25. When a memory address is requested, the leftmost X-bits of the requested address are compared with the starting addresses of the slots. As will be described in greater detail, eight of the comparators indicate if the top X-bits of the requested memory address are less than the starting address of the associated memory slot or, alternatively, greater than or equal to the associated starting address. The ninth comparator indicates if the top X-bits of the requested memory address are less than or equal to the ending address, or, alternatively, greater than the ending address. The results of the comparisons are then ANDed in a manner such that the output of only one of the AND gates 29 will be a 1 thereby defining which slot contains the data for the requested address.

The number X is chosen such that $X = n + m - p$, where:

$2^P$ = the minimum amount of memory bytes which can be contained on a memory card, n = the number of bits in the memory addresses in the computer system, and $2^m$ bytes = the number of bytes accessed by a memory address.

As stated in the background of the invention section, an address does not necessarily have to refer to a single byte of information. As noted above, an address may refer to a much larger block of data. When the CPU obtains the data, it can then break it down into its smaller components, i.e. its individual bytes of data, in order to extract the desired data. As noted above, the value of $2^m$ represent the number of individual bytes that each address refers to. Therefore, if each address addresses a block of eight doublewords, i.e., 64 bytes, then m would be 6 since $2^6$ bytes = 64 bytes. If it is further assumed that the computer system uses twenty-seven bit addresses so that it can access $2^{27}$ separate blocks of data, such a system would be capable of addressing $2^{27-6}$ bytes using addresses of only 27 bits. Continuing with the above example, the smallest density memory card which can be inserted into the memory backplane contains 64 MB or $2^{26}$ bytes. Therefore, in a computer system which uses 27 bit addresses, each address referring to a block of $2^6$ bytes and the smallest memory card contains $2^{26}$ bytes of storage, $X = 27 + 6 - 26 = 7$ bits.

The X-bit starting addresses are generated as will now be described. The X-bit starting addresses (and ending address) are code words which the computer understands as uniquely representing the lowest address that is available on the board inserted in the associated slot (or in the case of the ending address, the highest address on the last board). First, the format of the memory address is converted so that it addresses one byte of memory. This is done by adding M-bit positions to the right of the address. In the current example of a system in which each address addresses eight double words, i.e. 64 bits, six bit positions should be added to the right of the memory address to convert it to a byte address. The starting addresses and the ending address for the last board are generated by simply taking the leftmost X-bits of the n+m bit long byte address.

In its simplest terms, the X-bit starting addresses are simply the leftmost X-bits of the actual address assigned to the first information block in a slot. Likewise, the X-bit ending address of the last board is simply the leftmost bits of the actual last address of the memory subsystem. Since $2^p$ is the minimum possible memory increment per board, the provision that $X = n + m - p$ assures that the X-bit starting address of each board will be different by, at least, the least significant bit of the X-bit starting address.

It should also be noted that the m term is required in the $X = n + m - p$ equation for the sole purpose of converting the units of n, i.e. data packets, to the units of p, i.e. bytes.

If a slot is vacant, then it is simply assigned a starting address that is the next address after the last address of the closest preceding slot having a memory board installed therein. The reasons for this will become apparent shortly.

Once the X-bit starting addresses and ending address are generated, a simple combined hardware and software method for selecting the board upon which the data for a requested memory address is found can be implemented. The starting address of each slot and the ending address of the last slot are each fed into one of the inputs of a comparator 25. In a situation as in the present example, where there are eight slots on the memory backplane, nine comparators are used, one for each starting address plus one for the ending address. The leftmost X-bits of the currently requested memory address are fed into the other input of each of the comparators. Each comparator has two single bit output lines.

For the starting address comparators, the first output line is placed in a high state if the comparator determines that the leftmost X-bits of the currently requested memory address are less than the slot starting address with which it is compared and in a low state otherwise. The second output is merely the inverse of the first output, that is, the second output is in a high state if the leftmost X-bits of the currently requested memory address are greater than or equal to the associated slot starting address.

For the ending address comparator, the first output line is placed in a high state if the comparator determines that the leftmost X-bits of the currently requested memory address are less than or equal to the ending address and in a low state otherwise. Again, the second output of the comparator is merely the inverse of the first output.

As shown in FIG. 2, the first output of each comparator is AND-ed with the second output of the preceding comparator. Since there is no preceding comparator for the first slot, the first output of the first comparator is unused. Since the leftmost X-bits of the currently requested memory address can only be greater than or equal to the starting address of a given slot and less than the starting address of the suceeding slot when the currently requested address is contained in the given slot, only one of the AND gates will have a high output while the rest are low. As can be seen in FIG. 2, the combined outputs of the AND gates will uniquely define the board upon which the currently requested address can be found. The process can be taken one step further by providing an eight bit encoder 28 which can encode the eight bits received from the AND gates into a three bit board select signal 29.

The X-bit ending address for the last slot is an additional feature of the system. If the leftmost X-bits of the currently requested memory address exceed the ending address of the last slot, then none of the outputs of the first eight AND gates will be high. This situation indicates that the requested address is not within the actual physical memory of the subsystem. The second output of the comparator associated with the ending address of the last slot can be supplied to the memory controller to indicate a memory overflow error. When this signal is high, i.e. the leftmost X-bits of the currently requested address exceed the ending address of the last slot, a memory overflow error has occurred.

The method and apparatus of this invention ar further adaptable for use in computer systems having more than one memory subsystem (or backplane). In a system having multiple memory backplanes, this system can be modified as shown in dotted outline in FIG. 2. Instead of sending the second output of the ending address comparator for each memory backplane directly to the memory controller, it would be ANDed with a check mismod (missing memory module) signal 23 from the scan register 22. The output of AND gate 31 is forwarded to the memory controller as a memory overflow indicator. The check mismod bit is set to a low state for all memory backplanes except the last memory backplane containing the highest address in the entire system, which is set to a high state. Therefore, if the specified memory address exceeds the last address on any memory backplane other than the last memory backplane, it will not issue a memory overflow error signal. Only if the currently specified address exceeds the ending address of the last backplane can a memory overflow error signal be sent to the memory controller.

It should be noted that this memory board selection scheme creates a contiguous, holeless memory address space, even when backplane slots are unoccupied. As noted above, unoccupied slots are assigned the next address after the closest preceding slot having a board inserted therein. The same address, however, would also be assigned to the next occupied slot. Thus, the two compare conditions required to select an unoccupied slot can never both be met.

There is one unique situation in which this scheme must be modified in order for the system to operate correctly. This occurs when the last slot of a backplane is unoccupied. If, when the last slot is empty, the ending address were derived in the manner just described, the ending address would be the same a the starting address for that board and therefore the last slot could be selected when the leftmost X-bits of the currently requested memory address are equal to the starting address of the last slot, even though no board resides there. In this special case in which no board resides in the last slot of the memory subsystem, the X-bit ending address for the slot is made one less than the starting address of the last slot, or alternatively, is generated by adding n bits to the right of the highest address of the closest preceeding slot having a memory card installed therein. This will prevent the slot from ever being selected and also prevent a memory overflow signal from being issued erroneously.

Figure 3:
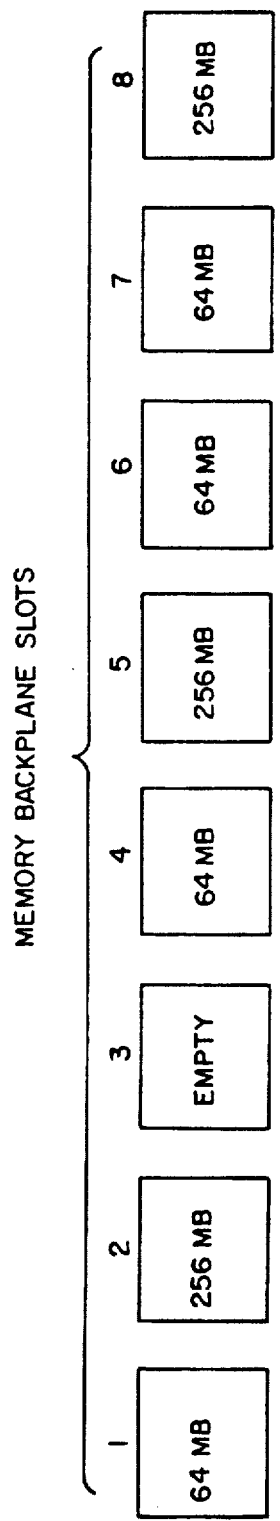
FIG. 3 shows an example schematic representation of one possible arrangement of memory boards in a computer system having one memory backplane subsystem.

To assist in the understanding of the present invention, FIG. 3 shows an example system having an eight slot memory backplane with various sized memory cards inserted therein. As before, this system will be assumed to use 27 bit addresses, each address addressing a block of $2^6$ bytes of information and the smallest memory increment being 64 MB or $2^{26}$ bytes. Therefore, as before, $X = 27 + 6 - 26 = 7$. The starting address for board 1 in FIG. 3 is 0000000 since the memory address begins with address 0. Using the methods described in the previous section, the starting address for each subsequent board is determined as shown below.

Adding 6 zero bits to the 27 bit first address for board 1 in order to convert it to a 33 bit address, we obtain

| bit | 3332222222222211111111111 |
|---|---|
| # | 210987654321098765432109876543210 |
| value | 000000000000000000000000000000000 |

Since board 1 is a 64 MB board, slot 1 should respond to addresses in the range of

| bit | 3332222222222211111111111 |
|---|---|
| # | 210987654321098765432109876543210 |
| value | 000000000000000000000000000000000 |
| | to |
| bit | 3332222222222211111111111 |
| # | 210987654321098765432109876543210 |
| value | 000000011111111111111111111111111. |

Obviously, the starting address for board 2 will be 1 unit greater than the last address on board 1. Therefore the first address than will be found on board 2 is

| bit | 3332222222222211111111111 |
|---|---|
| # | 210987654321098765432109876543210 |
| value | 000000100000000000000000000000000 |

Truncating after the leftmost 7 bits, one obtains 0000001 as the starting address for board 2. Since card 2 contains 256 MB, board 2 should respond to addresses

| bit | 3332222222222211111111111 |
|---|---|
| # | 210987654321098765432109876543210 |
| value | 000000100000000000000000000000000 |
| | to |
| bit | 3332222222222211111111111 |

-continued

```
#      2 1 0 9 8 7 6 5 4 3 2 1 0 9 8 7 6 5 4 3 2 1 0 9 8 7 6 5 4 3 2 1 0
value  0 0 0 0 1 0 0 1 1 1 1 1 1 1 1 1 1 1 1 1 1 1 1 1 1 1 1 1 1 1 1 1 1
```

The starting address for board 3 is then

```
bit    3 3 3 2 2 2 2 2 2 2 2 2 2 1 1 1 1 1 1 1 1 1 1
#      2 1 0 9 8 7 6 5 4 3 2 1 0 9 8 7 6 5 4 3 2 1 0 9 8 7 6 5 4 3 2 1 0
value  0 0 0 0 1 0 1 0 0 0 0 0 0 0 0 0 0 0 0 0 0 0 0 0 0 0 0 0 0 0 0 0 0
```

Truncating after the leftmost 7 bits, the result is 0000101. Continuing with this method we obtain the following addresses for the remaining 5 memory boards:

| Board | Starting Address |
|---|---|
| 4 | 0000101 |
| 5 | 0000110 |
| 6 | 0001010 |
| 7 | 0001011 |
| 8 | 0001100 |

Note that because there was no memory board installed in slot 3, the starting address for slot 4 is the same as for slot 3. Slot 3, therefore, can never be selected since the inputs to the board 3 AND gate can never both be in the high state simultaneously.

Since the X-bit starting address for board 8 is 0001100000000000000000000000000000 and because the board inserted in slot 8 contains 256 MB, the ending address for board 8 is 0001111111111111111111111111111111.

Truncating after the first 7 bits, the ending address of the subsystem is 0001111.

Once the inventive concept is understood, the following alternative method of determining the X-bit starting addresses and X-bit ending address for the memory boards becomes apparent. If the first memory board contains $2^r$ bytes, then it should respond to memory addresses 0 through 00 ... 0111 ... 1 where the leftmost "1" is in the $r-1^{th}$ bit position of the address. Hence, the first memory address of the second memory board is obtained by adding a 1 to the $r^{th}$ position of the first memory address that the first memory board responds to. This address would be 00 ... 0100 ... 0 where "1" is in the $r^{th}$ position in the address. The starting address for the second memory board is obtained by truncating this address after the top X-bit. Further, if the second memory board contains $2^s$ bytes of memory, the starting address for the third memory board, is obtained by simply adding a 1 to the $s^{th}$ position of the first address of the preceding board, that is the second board. In the general case then, with the exception of the very first memory board, the starting address for a memory board whose preceding memory board contains $2^t$ bytes memory is obtained by adding a 1 to the $t^{th}$ position of the first address that the preceding memory board contains and truncating after the leftmost X-bits. Likewise, the ending address for the memory board inserted in the last slot, containing $2^u$ bytes, is obtained by adding a 1 to the $u^{th}$ position of the last address that the preceding memory board contains.

Figure 4:
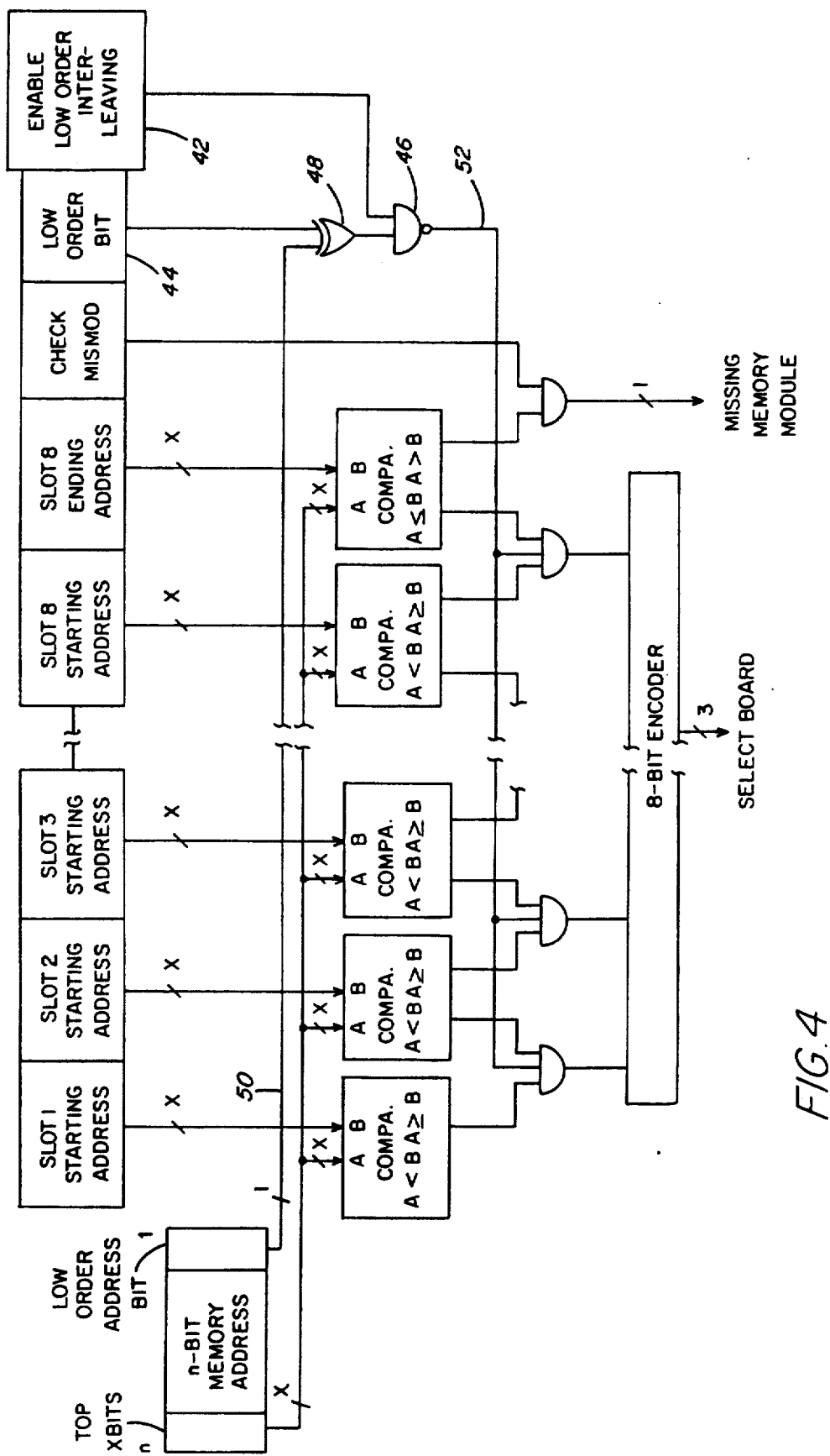
FIG. 4 shows a generalized illustration of the memory board selection hardware of the present invention including the alternative high or low order interleaving scheme.

FIG. 4 shows an alternative embodiment of the present invention wherein the memory subsystems ar adapted to provide alternate low or high order interleaving of addresses. The additional hardware necessary to implement this scheme is minimal and is shown in FIG. 4. The alternate embodiment will be described with respect to a computer system containing two memory subsystems. However, it should be understood that the low order interleaving scheme described herein can be expanded to accommodate any number of memory subsystems corresponding to a power of two. Two additional bits are required in the scan register 22 of each subsystem. They are an Enable Low Order Interleaving bit 42 and a Low Order bit 44. Bit 42 enables low order interleaving when high and enables high order interleaving when low. Bit 44 is set to zero for the memory subsystem which is to respond only to even addresses and is set to one for the associated memory subsystem which is to respond to odd addresses. The additional hardware further comprises a NAND gate 46, an EXCLUSIVE-OR gate 48 and an additional line 50 providing the LSB of the currently requested memory address to an input of the EXCLUSIVE-OR gate 48. The output 52 of the NAND gate is provided as an enable signal to the AND gates 29.

In a situation where high order interleaving is desired, bit 42 is set low, thereby causing the output of NAND gate 46 to be high regardless of the output of the exclusive OR gate 48. When the output 52 of NAND gate 46 is high, the AND gates 29 are enabled and the system operates exactly as described with relation to FIGS. 2 and 3 where, in effect, the AND gates were always enabled.

However, if low order interleaving is desired, bit 42 is set high, thereby causing the enablement of AND gates 29 to depend upon the output of exclusive OR gate 48. EXCLUSIVE-OR gate 48 compares the low order bit 44 to the LSB of the currently requested address. As stated above, if it is desired that this particular memory subsystem responds to even addresses, bit 44 is set to 0 such that the output of EXCLUSIVE-OR gate 48 will be high only when the LSB of the requested address is 1. This causes the output 52 of the NAND gate 46 to be low thereby disabling the memory subsystem for all odd addresses, i.e., addresses where the LSB is 1. Alternatively, when the LSB is 0, the output of EXCLUSIVE-OR gate 48 is low thereby causing the output of NAND gate 46 to be high, which enables the AND gates 29. Obviously, the low order bit 44 of the second memory subsystem is set to the opposite condition as the low order bit of the first memory subsystem. Also, the enable low order interleaving bit 42 of each subsystem must be set to the same value.

Note that because there must be an equal number of even and odd addresses in the address space for low order interleaving, the amount of total memory in both memory subsystems must be equal. However, unlike the prior art, there is no restriction as to what size memory boards can be installed in each slot. This differs markedly from past systems in that the amount of memory installed in each slot of one memory system had to be identical to the amount of memory installed in the corresponding slot of the second or subsequent memory subsystem. This was necessary so that the even and odd addresses did not have holes in different spaces.

Memory overflow detection for this configuration operates the same as described above with relation to FIGS. 2 and 3 except for the fact that the memory overflow signal of any of the subsystems can be enabled and is not limited to the memory subsystem containing the highest addresses, as was the case for high order interleaving. When the subsystems are low order interleaved, all subsystems have the same X-bit ending address, and therefore, any one of the memory overflow signals can be enabled.

This scheme of alternative high or low order interleaving is further adaptable to systems having more than two memory subsystems. For instance, a system having four memory subsystems may be equipped with alternative high or low interleaving by simply providing two low order bits 42 instead of one. The low order bit for the four memory subsystems would be 00, 01, 10 and 11.

The generation of the starting and ending address for all subsystems would be performed substantially identically to the manner described above in relation to the high order interleaving of FIGS. 2 and 3. However, there are two conceptual differences. First the X-bit starting address for all memory subsystems is 0. Second, in calculating the X-bit starting and ending addresses, each memory slot is assumed to be populated with two times as much memory as is actually installed in each slot, where two equals the number of memory subsystems in the system. The reasons for these two modifications should be apparent. In low order interleaving, the memory in each subsystem starts and ends at the same addresses (give or take Z address spaces, which will not affect the value of the X-bit starting or ending address). Further, since the consecutive memory locations in each subsystem are designed to respond, not to consecutive addresses, but to one out of every Z consecutive addresses, a memory subsystem having Y addressable memory locations in a low order interleaved system having Z memory subsystems responds to addresses 0 through Z·Y, rather than simply 0 through Y. Only one out of every Z consecutive addresses is contained in each memory subsystem.

Note that each slot in a memory subsystem need not have the same amount of memory as the corresponding slot in every other memory subsystem, as was required by the prior art, since there are no holes in the memory of the present invention. However, the total memory in each subsystem still must be equal.

The addition of the hardware for implementing the alternative low or high order interleaving ability provides an extra flexibility in the performance and servicability of the computer system. Certain types of computer applications may run optimally with a low order interleaved memory configuration while other types of computer applications may run optimally with a high order interleaved memory configuration. With the above described scheme, the memory can be easily set up to either type of interleaving.

For systems with multiple memory subsystems which are not a power of two, either high order interleaving or a combination of low and high order interleaving can be used. For example, a system with three memory subsystems can have addresses 0 through X low order interleaved between two memory subsystems (with twice as much memory assumed to be in each slot when calculating the starting addresses), with addresses X+1 through Z serviced by the third memory subsystem. Alternatively, the three memory subsystems may simply be high order interleaved.

Having thus described one particular embodiment, various alterations, modifications and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is intended to be exemplary only, and not limiting. The invention is limited only as defined in the following claims and equivalents thereto.

What is claimed is:

1. A method of selecting one of a plurality of memory cards installed in consecutive memory card slots of memory backplane of a computer system having a memory controller for controlling access to the memory cards, in response to a computer request for a specified memory address, the selected card containing the specified memory address, comprising the steps of:

using the memory controller to generate a starting address for each slot, wherein the starting addresses are X-bits in length, where $X = n + m + p$, $2^p$ bytes = the minimum number of memory bytes which can be contained on a memory card, n = the number of bits in the memory addresses of the computer system, and $2^m$ bytes = the number of bytes accessed by a memory address, and the starting address being a unique representation of the lowest memory address which is on the memory card installed in the associated slot or, if no memory card is installed in a slot, the next higher address than is contained in the closest preceding slot in the closest preceding slot having a memory card installed therein, and the starting addresses are generated by the steps of:

adding m bits to the right of the lowest numbered address which is found at the associated slot or if no card is installed in the associated slot, adding m bits to the right of the next higher address than is contained in the closest preceding slot having a memory card installed therein; and truncating the n+m bit addresses after the leftmost X-bits;

generating, for each slot, in response to a comparison performed by comparison means of the starting address of the associated slot with the specified memory address, a first signal from said comparison means which is in a first state if the starting address is less than the specified memory address and in a second state otherwise;

generating, for each slot, a second signal from said comparison means which is the inverse of the first signal; and generating, for each slot, a third signal output from a logic gate, said third signal being responsive to the first and second signals, and being in a first state, if the first signal of the associated slot and the second signal of the preceding slot are both in the first state and being in a second state otherwise.

2. A method as set forth in claim 1 further comprising the steps of:

generating an X-bit ending address for the last memory card slot, where the X-bit ending address represents the highest memory address on the memory backplane;

comparing the leftmost X-bits of the specified memory address with the ending address;

generating a fourth signal, in response to the comparison with the ending address, the fourth signal being in a first state if the leftmost X-bits of the specified memory address is less than or equal to the ending address and in a second state otherwise;

generating a fifth signal, in response to the comparison, that is the inverse of the fourth signal;

generating a memory overflow signal, in response to the fourth and fifth signals, that is in a first state when the fourth and fifth signals are both in the first state and in a second state otherwise.

3. A method as set forth in claim 2 wherein the ending address is generated by the steps of:

adding m bits to the right of the highest address available at the last slot, or if no card is installed in the last slot, adding m bits to the right of the highest address of the closest preceeding slot having a memory card installed therein; and truncating after the leftmost X-bits.

4. A method as set forth in claim 3 wherein the memory overflow signal is supplied directly to the computer and indicates a memory addressing error if in the first state.

5. A method as set forth in claim 3 further comprising the step of:

generating, in response to the series of third signals and to the memory overflow signal, a Z bit code which defines the memory card slot which contains the specified memory address, where $2^Z$ is greater than or equal to the number of memory card slots.

6. A method as set forth in claim 5 wherein the lowest address contained on a memory card is determined by the steps of:

determining the number of possible memory sizes which may be installed in a memory card slot, devising a series of code words, each code word uniquely representing one of the possible memory sizes which may be installed in a memory card slot;

providing to the computer a code word associated with each memory card slot for indicating the size of the memory installed in the associated slot;

calculating the lowest address contained on each of the memory cards based on the code words.

7. A method of selecting one of a plurality of memory cards installed in memory card slots of a memory backplane associated with a computer system having a memory controller for controlling access to the memory cards, in response to a request from the computer system for an operation relating to a specified memory address, the selected memory card being the memory card which contains the specified memory address, comprising the steps of:

using the memory controller to generate an X-bit starting address for each memory card slot, where $X = n + m - p$, and n is the number of bits in the memory addresses used by the computer system, $2^m$ is the number of bytes of memory at each address, and $2^p$ is the smallest number of memory addresses which may be contained on a memory card, and where the X-bit starting addresses are generated by:

a) adding m bits to the right of the lowest numbered address which is found at the associated slot, or if no card is installed in the associated slot, adding m bits to the right of the next higher address than is contained in the closest preceding slot having a memory card installed therein, and b) truncating the n+m bit addresses after the leftmost X-bits;

using the memory controller to generate an X-bit ending address for the last memory card slot where the X-bit ending address represents the highest memory address on the memory backplane by;

a) adding m bits to the right of the highest address on the memory card installed in the last slot, or if no card is installed in the last slot, adding m bits to the right of the highest numbered address that is contained in the closest preceding slot having a memory card installed therein, and b) truncating the n+m bit address after the leftmost X-bits;

comparing the top X-bits of the specified memory address with each of the starting addresses of the memory card slots and the ending address using comparison means;

generating a first signal in response to each comparison by said comparison means, the first signal being in a first state if the specified memory address is less than the starting address of the associated memory card slot and in a second state otherwise;

generating a second signal in response to the comparison at each memory card slot by said comparison means, the second signal being the inverse of the first signal; and AND-ing the first signal of each comparison with the second signal of the comparison associated with the preceding memory card slot using a logic gate, if any, so as to generate a third signal for each AND-ing operation that is in a first state if the two inputs are both in the first state and in a second state otherwise, thereby causing only one output of the AND-ing operation to be in the first state thereby indicating the memory card slot which contains the currently specified memory address.

8. An apparatus for selecting a memory card containing a specified memory location out of a plurality of memory backplanes, each backplane comprising a plurality of slots for accepting memory cards therein, the apparatus allowing either high or low order interleaving of the backplanes, the apparatus comprising:

means, associated with each backplane, for providing a unique X-bit low order bit signal, where $2^Y$ is the number of backplanes in the system;

means, associated with each backplane, for comparing the low order bit signal with the Y least significant bits of the specified memory location and producing a Select signal if a match is detected;

means for providing an Enable Low Order Interleaving bit which is set to a first state if low order interleaving is to be activated and to a second state if high order interleaving is to be activated;

means, associated with each backplane, for enabling the backplane only when 1) the Select signal and Enable Low Order Interleaving signal are both activated or 2) the Enable Low Order Interleaving signal is deactivated; and means, associated with each backplane, for selecting the memory board containing the specified memory location.

9. An apparatus as set forth in claim 8 wherein the low order bit signal is stored in a register.

10. An apparatus as set forth in claim 8 wherein the means for comparing comprises an EXCLUSIVE-OR gate.

11. An apparatus as set forth in claim 10 wherein the means for enabling the backplane comprises a NAND gate having an output coupled so as to enable the means for selecting the memory board.

12. An apparatus as set forth in claim 11 wherein the means for selecting the memory board containing the specified memory location comprises:
- means for generating and supplying a starting address for each slot, the starting address being a representation of the lowest memory address which is contained on the memory card installed in the associated slot or, if no memory card is intalled in a slot, the next higher address than is contained in the closest preceeding slot having the memory card installed therein, the starting address being different than any other starting address for a slot on the same memory backplane;
- a comparator associated with each slot, each comparator having a first input coupled to receive the specified memory address, a second input coupled to receive the associated starting address, a first output which is placed in a first state if the first input is less than the second input and in a second state otherwise, and a second output which is the inverse of the first output; and
- an AND gate associated with each of the comparators, each AND gate having a first input coupled to the second output of the associated comparator, a second input coupled to the first output of the succeeding comparator, and an output which is in a first state if the first and second inputs are in the first state and in a second state otherwise, such that the output of only the AND gate associated with the memory slot containing the specified memory address will be in the first state.

13. An apparatus as set forth in claim 12 wherein the mean for selecting the memory board containing the specified memory location further comprises:
- means for generating an ending address for the last slot, the ending address being a representation of the highest address on the card in the last slot, or if no card is in the last slot the ending address being a representation of the highest address on the closest preceding slot containing a memory board; and
- an ending address comparator having a first input coupled to receive the specified memory address and a second input coupled to receive the ending address of the last slot, a first output that is in a first state if the first input is less than or equal to the second input or in a second state otherwise, and a second output that is the inverse of the first output.

14. An apparatus as set forth in claim 13 wherein the starting addresses and ending addresses are X-bits in length or $X = N + M - P$; and
- $2^P$ bytes is the minimum number of memory bytes which can be contained on a memory card,
- N is the number of bits in the specified memory address, and
- $2^M$ bytes is the number of bytes accessed by a memory address.

15. An apparatus as set forth in claim 14 wherein, the starting addresses are generated by adding M bits to the right of the lowest numbered address which is found at the associated slot, or if no card is installed in the associated slot, adding M-bits to the right of the next higher address than is contained in the closest preceding slot having a memory card installed therein; and
- truncating the N+M bit address after the left-most X bits.

16. An apparatus as set forth in claim 15 wherein the ending addresses are generated by adding M-bits to the right of the highest numbered address which is found at the associated slot, or if no card is installed in the associated slot, adding M bytes to the right of the highest address contained in the closest preceeding slot having a memory card installed therein; and
- truncating the N+M bit address after the left-most X bits.

17. A method for selecting a memory card containing a specified memory location out of a plurality of memory backplanes, each backplane comprising a plurality of slots for accepting memory cards therein, the apparatus allowing for either high or low order interleaving of the backplanes, comprising the steps of:
- supplying a unique Y-bit low order bit signal for each backplane, where $2^Y$ equals the number of backplanes in the system;
- comparing with a comparison means the low order bit signal with the Y least significant bits of the specified memory location;
- producing from said comparison means, for each backplane, a select signal if a match is detected between the low order bit signal and the Y least significant bits of the specified memory location;
- providing to each backplane an enable low order interleaving bit which is set to a first state if low order interleaving is to be activated and to a second state if high order interleaving is to be activated;
- enabling the backplane when 1) the Select signal and Enable Low Order Interleaving signal are both activated or 2) the Low Order Interleaving signal is deactivated; and
- providing means in each backplane for selecting the memory board containing the specified memory location.

* * * * *